United States Patent
Ruizzo, Jr. et al.

[11] Patent Number: 6,135,097
[45] Date of Patent: Oct. 24, 2000

[54] POLLUTION CONTROL TRANSFORMER

[75] Inventors: Gladio Ruizzo, Jr.; Daniel P. McKiernan, both of Providence, R.I.

[73] Assignee: Emission Control Company, Providence, R.I.

[21] Appl. No.: 08/663,924

[22] Filed: Jun. 14, 1996

[51] Int. Cl.[7] .................................................. F02M 25/06
[52] U.S. Cl. ......................... 123/536; 123/572; 123/549
[58] Field of Search ................................... 123/536, 537, 123/538, 549, 572; 210/222, 695

[56] References Cited

U.S. PATENT DOCUMENTS

| | | | |
|---|---|---|---|
| 3,989,017 | 11/1976 | Reece | 123/536 |
| 4,308,847 | 1/1982 | Ruizzo | 123/536 |
| 4,414,951 | 11/1983 | Saneto | 123/536 |
| 5,161,512 | 11/1992 | Adam et al. | 123/536 |
| 5,536,401 | 7/1996 | Burns | 123/538 |

*Primary Examiner*—Marguerite McMahon
*Attorney, Agent, or Firm*—Popham, Haik, Schnobrich & Kaufman, Ltd.

[57] ABSTRACT

An improved combustion and anti-pollution device for a motor vehicle having an internal combustion engine is shown in which the device reaches optimal operating temperature and thus maximum effectiveness almost at the same instant as the starting of the vehicle. In an embodiment of the pollution control transformer of the present invention, the basic components include a casing, a rod, a coil, an iron disk, a disk-shaped permanent magnet, and components for controlling the operating temperature of the coil. The components for controlling the operating temperature of the coil can be active heat control components, which include a heating filament, and passive heat control components, which include heat insulation materials such as silicon fiber resin materials surrounding the coil of the device.

11 Claims, 3 Drawing Sheets

POLLUTION CONTROL TRANSFORMER

BACKGROUND OF THE INVENTION

1. Field of the Invention

The present invention relates to a device which causes gasoline powered vehicle engines to combust gasoline more efficiently, thus increasing the power output and reducing the production of harmful pollutants.

2. Related Art

The present invention relates to a combustion and anti-pollution device disclosed in U.S. Pat. No. 4,308,847, wherein an electromagnetic device is disposed within a gaseous material loop connecting the crankcase and engine cylinders of an internal combustion engine. In the device disclosed in U.S. Pat. No. 4,308,847, a gaseous mixture from the engine crankcase is passed through the device and subjected to a magnetic field with the resultant effect of energizing the molecular particles in the gaseous stream. Emissions from the device are drawn into the engine's positive crankcase ventilation (PCV) system and then into the engine cylinders. An inherent disadvantage of devices known in the art is that such devices rely on engine heat radiated or convected within the engine compartment to reach an optimal operating temperature. Therefore, devices such as those disclosed in U.S. Pat. No. 4,308,847 do not begin to operate at peak efficiency until the engine has warmed up.

SUMMARY OF THE INVENTION

It is an object of the present invention to provide an improved combustion and anti-pollution device of simple structure in which the device reaches optimal operating temperature and thus maximum effectiveness almost at the same instant as the starting of the vehicle. In an embodiment of the pollution control transformer (PCT) of the present invention, the basic components include a casing, a rod, a coil, an iron disk, a disk-shaped permanent magnet, and means for controlling the operating temperature of the coil. The PCT is substantially cylindrical in shape, with an output of the PCT being connected to the existing positive crankcase ventilation (PCV) system associated with a vehicle engine. The PCT is also provided with an inlet opening through which ambient air taken from the engine compartment is drawn into the PCT. The PCT generates a magnetic field through which the ambient air drawn from the engine compartment is passed on its way into the positive crankcase ventilation system prior to injection into the cylinders of the engine.

The cylindrical casing of the PCT is constructed from a non-electrically conductive material such as polyvinyl chloride tubing. The PCT casing is constructed in two parts, with the two parts being connected together to form a substantially cylindrical casing having opposite closed ends. The upper part of the PCT casing is closed at one end with a hole through the closed end to allow passage of the rod. When assembled, a small portion of the rod projects to the outside of the casing through the hole in the closed end of the casing. The majority of the length of the rod is positioned within the housing. The portion of the rod projecting to the outside of the casing is electrically connected to a source of electrical current on the vehicle. The upper part of the PCT casing contains the coil, means for controlling the operating temperature of the coil, the rod, an iron disk and a disk-shaped permanent magnet.

In a first embodiment of the present invention, the means for controlling the operating temperature of the coil comprises heat insulation that fills the upper part of the casing around the coil. The heat insulation is of the type that can be readily inserted through an opening in the casing to fill all voids in and around the coil. One preferred type of heat insulation is a silicon and fiber resin heat insulation of the type sold as "G.E. Silicon and Fiber Resin". The heat insulation around the coil assists in the retention of the heat generated by the coil during normal operation. The use of such "passive" heat control also allows the coil to reach optimal operating temperature for maximum effectiveness very rapidly after the starting of the vehicle engine.

In a second embodiment of the present invention, the means for controlling the operating temperature of the coil comprises a heating filament wrapped around the coil and electrically connected to the source of electrical current. A thermostat can also be provided to electrically connect or disconnect the heating filament from the source of electrical current based on the temperature within the engine compartment. The use of such "active" heat control components allows the coil to reach optimal operating temperature for maximum effectiveness very rapidly after the starting of the vehicle engine.

The upper part of the PCT casing also contains the iron disk and disk-shaped permanent magnet, which are press fit or welded into the lower end of the upper part of the PCT casing. The rod, which is constructed preferably from a copper and zinc alloy, preferably having the composition of 70% copper and 30% zinc, extends into the upper part of the PCT casing through a hole centered in the closed top end of the casing. A copper coil having preferably 19 turns and being formed with 0.0334 inch diameter coated copper wire, surrounds a lower portion of the copper/zinc rod and is electrically connected to the rod at one end by a copper post. The opposite end of the copper coil is electrically connected through another copper post to the iron disk. The post electrically connecting the copper coil to the iron disk is one of three posts used to support the coil on the iron disk. Two of the three support posts do not provide any electrical connection between the coil and the iron disk.

The upper part of the PCT casing is assembled with the rod, copper coil, iron disk, disk-shaped permanent magnet, and means for controlling the temperature of the copper coil. After assembly, the upper part of the PCT casing is threaded into the lower part of the PCT casing with an air gap of preferably ¾ inch left between the bottom face of the permanent magnet and the bottom of the lower part of the PCT casing. An outlet opening is provided through the lower part of the PCT casing in order to provide access to the air gap below the permanent magnet. Portions of the lower part of the PCT casing form a laterally extending nozzle that defines the outlet opening and provides a means for connecting a tube between the PCT and the vehicle's existing positive crankcase ventilation system. A means for controlling the operating temperature of the copper coil in the upper part of the PCT device is provided in order to bring the device to its most efficient operating temperature as quickly as possible after starting of the vehicle's engine. The means for controlling the temperature can be provided in the form of either "active" or "passive" temperature control components. With active temperature control, a heating filament is wrapped around the copper coil and electrically connected to be activated upon the starting of the engine. If passive heating is desired, the heat generated by passing electric current through the copper/zinc rod and the copper coil is prevented from dissipating to the engine compartment by filling the upper part of the PCT around the copper coil with a silicon fiber resin insulating material.

The means for controlling the temperature of the coil, whether including active or passive heat control components, allows the PCT to reach its optimal operating temperature very quickly after the starting of the engine. When operating at its optimal temperature the effectiveness of the PCT in producing electromagnetic energy to energize the vapors that are passed on to the positive crankcase ventilation system and into the cylinders is maximized. Therefore, the PCT with means for controlling the temperature of the coil provides the greatest improvement to the efficiency of combustion within the internal combustion engine. The active or passive temperature control components in the PCT device thereby greatly reduce cold start carbon monoxide emissions generated by the engine.

BRIEF DESCRIPTION OF THE DRAWINGS

The invention is better understood by reading the following Detailed Description of the Preferred Embodiments with reference to the accompanying drawing figures, in which like reference numerals refer to like elements throughout, and in which.

DETAILED DESCRIPTION OF THE PREFERRED EMBODIMENTS

Figure 1:
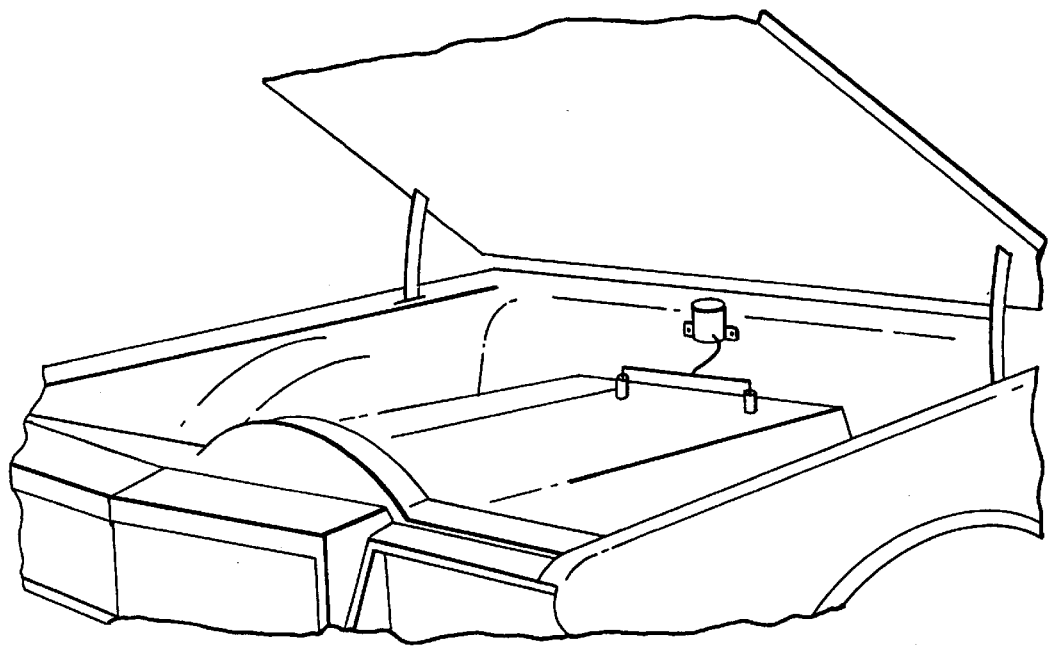
FIG. 1 is a perspective view of an internal combustion engine mounted within an automobile and utilizing the device of the present invention.

In describing preferred embodiments of the present invention illustrated in the drawings, specific terminology is employed for the sake of clarity. However, the invention is not intended to be limited to the specific terminology so selected, and it is to be understood that each specific element includes all technical equivalents which operate in a similar manner to accomplish a similar purpose.

Figure 2:
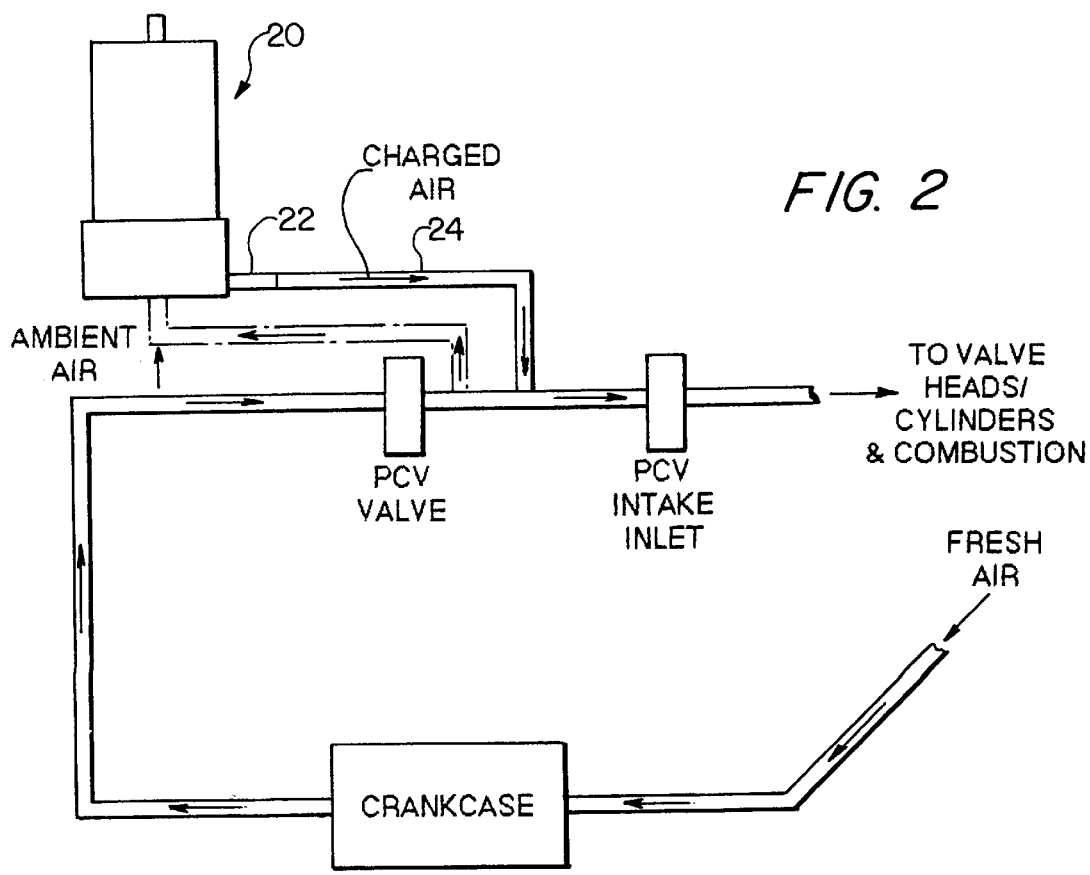
FIG. 2 is a schematic view showing the disposition of the device of the present invention relative to other operational portions of the automobile.

The pollution control transformer (PCT) 20 of the present invention is adapted for use in any vehicle having a gasoline powered internal combustion engine and including a positive crankcase ventilation system. An outlet 22 of PCT 20 is connected through tubing 24 to the positive crankcase ventilation (PCV) system for the vehicle at a point downstream of the PCV valve and upstream of the intake inlets leading into the cylinders of the internal combustion engine. As shown in FIG. 2, the PCV system includes flow lines for drawing fresh air through the crankcase of the internal combustion engine, where it draws away pressurized, heated air and oil vapors, and then through a PCV valve, which regulates the flow of the pressurized, heated, oil vapor-laden air. The pressurized, heated, oil vapor-laden air is then passed through the intake valves of the internal combustion engine into the cylinders where the pressure, heat and vapors assist in the combustion process and the oil vapors are burned along with gasoline during a normal combustion cycle. The flow of gaseous vapors from the crankcase through the PCV valve and into the intake valves of each cylinder creates a suction which draws the air and the PCT's electromagnetic discharge from the outlet of the PCT 20 of the present invention.

Figure 3:
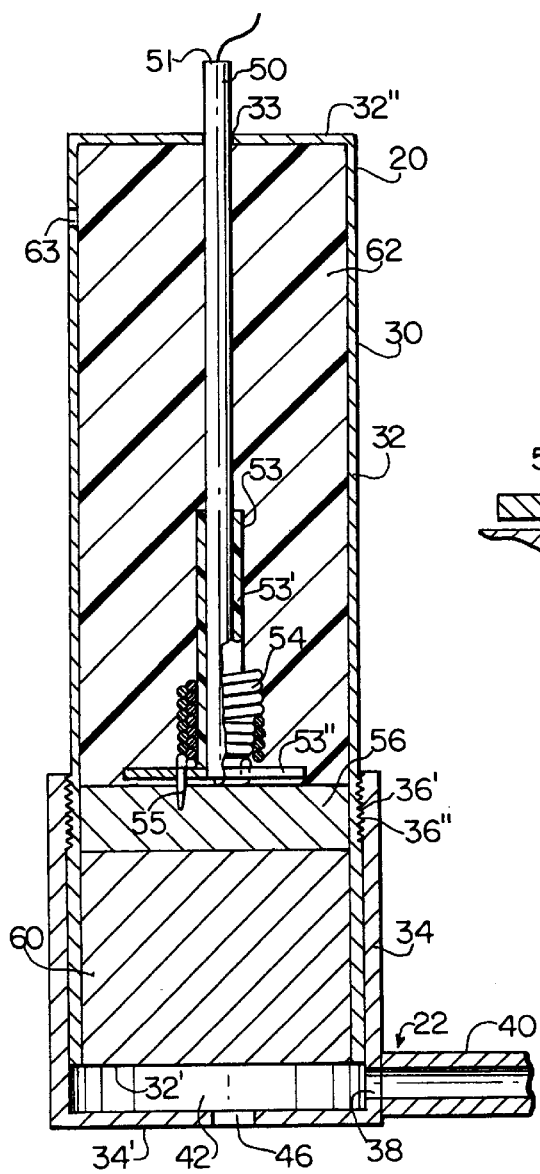
FIG. 3 is a side elevation view, partially in section, showing an embodiment of the present invention having a silicon fiber resin insulating material in the upper cavity of the device around the rod and copper coil of the device.

PCT device 20 includes a substantially cylindrical housing 30 having an upper part 32 and a lower part 34. As shown in FIG. 3, upper part 32 of housing 30 is provided with external male threads along a portion of the outer circumference of a lower portion of upper part 32. Lower part 34 of housing 30 is provided with internal female threads along a portion of the inner circumference of an upper portion of lower part 34.

Upper part 32 is threadedly engaged with lower part 34 after assembly of all of the internal components of the PCT such that the lower end 32' of upper part 32 is aligned just above an outlet opening 38 through lower part 34. Outlet opening 38 is provided through the wall of lower part 34 and through a nozzle 40 extending laterally from the lower end of lower part 34. The nozzle 40 can be integral with lower part 34 or provided as a separate piece. The outer diameter of nozzle 40 fits snugly within one end of tube 24, which is preferably ⅜ inch in diameter. Tube 24 connects the PCT device 20 to the PCV system of the vehicle.

As best shown in FIG. 3, when PCT device 20 is completely assembled, a cavity 42 remains between the lower 32' of upper part 32 and a bottom wall 34' of lower part 34. A central opening 46, preferably ⅛ inch in diameter, passes through lower wall 34' of lower part 34 and provides access to cavity 42. Suction created in tube 24 as a result of air flow in the positive crankcase ventilation system draws air from the engine compartment through opening 46 and cavity 42 and out through exit opening 38 and nozzle 40.

A rod 50 enters upper part 32 of casing 30 through a central opening 33 in upper end 32" of upper part 32. Rod 50 is preferably composed of 30% zinc and 70% copper, and is preferably 1.75 inches in length and 0.115 inch in diameter. The upper end 51 of rod 50 is electrically connected to a suitable source of direct electric current such as obtained from the standard ignition wire to the ignition coil of the vehicle. The lower end 52 of rod 50 is electrically connected to a copper coil 54, which preferably has 19 turns and is formed from electrically insulated copper wire 0.0334 inch in diameter.

Figure 4:
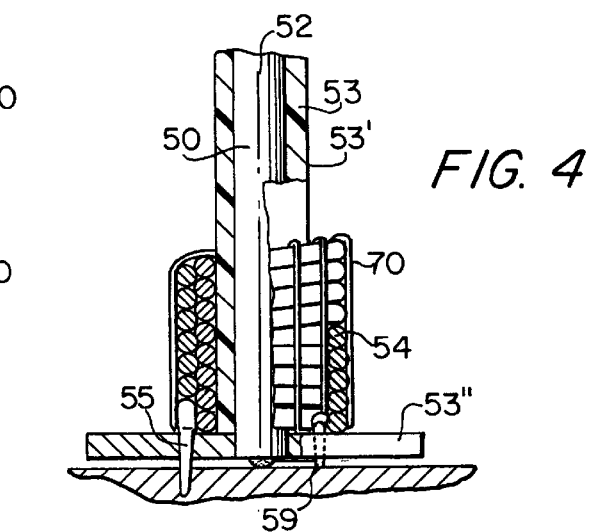
FIG. 4 is an enlarged side elevation view of a portion of the embodiment of the present invention shown in FIG. 5.
Figure 5:
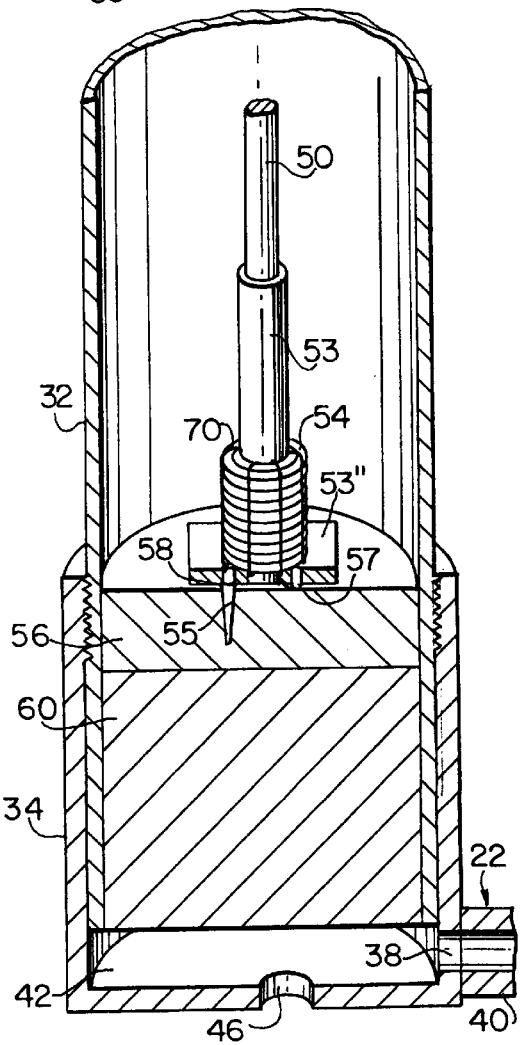
FIG. 5 is an isometric view, partially in section, showing the rod, copper coil, upper iron disk and lower, disk-shaped permanent magnet mounted within the housing of the present invention.

As shown in FIGS. 3 through 5, a preferred embodiment of the present invention includes a bobbin 53 made from plastic material surrounding lower end 52 of rod 50, with copper coil 54 being wrapped around bobbin 53. Bobbin 53 comprises a cylindrical portion 53', preferably approximately 0.25 inch in diameter, around which copper coil 54 is wrapped, and an integral base portion 53", extending outwardly from cylindrical portion 53'. Base portion 53" is shaped so as to allow for the mounting of four spaced copper posts 55, 57, 58, and 59, each approximately 0.375 inch in length.

Bobbin 53 is provided with a central axial bore through which copper/zinc rod 50 passes, with the end of rod 50 being flush with the bottom surface of base portion 53". One end of copper post 59 is bent over on the bottom surface of base portion 53" and electrically connected through soldering or other means to the end of rod 50. The opposite end of copper post 59 extends through base portion 53" and is electrically connected to a first end of copper coil 54. Copper coil 54 is wrapped ten times around cylindrical portion 53' in a direction away from base portion 53", and then nine times back toward base portion 53" and overlapping the inner ten windings for a total of nineteen turns. The end of copper coil 54 opposite from the end connected to post 59 is connected to copper post 55. Copper post 55 passes through base portion 53" and into a shallow hole in disk 56 that is approximately 0.125 inch deep, thus providing an electrical connection between rod 50, coil 54 and disk 56. Copper posts 57 and 58 also pass through base portion 53" and enter 0.125 inch deep holes in disk 56 at spaced positions, thus providing a stable connection between the assembly of rod 50, bobbin 53, and copper coil 54, and disk 56. Copper posts 57 and 58 are merely for support purposes, and do not provide any electrical connections. The length of copper posts 55, 57 and 58 ensures that base portion 53" of bobbin 53 is supported approximately 0.125 inch above disk 56, thus leaving room for the portion of copper post 59 that is bent along the lower surface of base portion 53" and electrically connected between rod 50 and copper coil 54.

As shown in FIGS. 3 through 5, coil 54 surrounds a lower portion of rod 50. Electrical current passes through rod 50, copper post 59, coil 54, copper post 55 and then enters iron disk 56. Iron disk 56 is preferably ¼ inch thick and 1 inch in diameter, and is press fit, glued, or otherwise secured to the inner diameter of upper part 32 of housing 30. The electrical connection between coil 54 and disk 56 is through copper post 55 connected to one end of coil 54. Copper post 55 is inserted into a 0.125 inch deep hole in the upper surface of disk 56, as are the two other copper posts 57 and 58 that are connected to bobbin base portion 53" and provide additional support for the assembly of rod 50, bobbin 53 and coil 54 over disk 56.

A permanent magnet 60, preferably composed from ALNICO 5, curve 4, is welded to the bottom surface of disk 56 and press fit, glued or otherwise secured to the inner diameter of upper part 32 of casing 30. Permanent magnet 60 is preferably ¾ inch thick and 1 inch in diameter. The bottom surface of permanent magnet 60 is aligned with the bottom end 32' of upper part 32.

Direct electric current from the vehicle ignition system passes through rod 50, through copper coil 54, and into disk 56. The electromagnetic field generated by the above-described construction in combination with the magnetic field generated by permanent magnet 60 imparts an electromagnetic charge to the gaseous vapors that are pulled in through inlet 46 into air cavity 42 before exiting from nozzle 40. It is believed that the insertion of such electromagnetic emissions into the cylinders of the engine helps to increase the bond strength of the gaseous molecules within the cylinders prior to combustion, thus resulting in the release of more energy during the combustion of the gasoline, and more complete combustion of the gasoline with the production of significantly reduced carbon monoxide emissions.

The temperature at which the electromagnet formed by rod 50, copper coil 54 and iron disk 56 operates partially determines the efficiency of the PCT device in producing electromagnetic emissions. In a first embodiment of the PCT device of the present invention, as shown in FIG. 3, a "passive" method of controlling the heat of the coil 54 of the electromagnet is used. After assembly of the rod 50, copper coil 54, disk 56 and permanent magnet 60 into upper part 32, a silicon-fiber resin insulating material 62 is inserted into upper part 32 through an opening 63 in the side wall of upper part 32. The insulating material 62 fills around rod 50 and copper coil 54, and between base portion 53" of bobbin 53 and disk 56, and thus serves to retain heat generated by copper coil 54 during operation of the PCT. The PCT device therefore reaches its optimal operating temperature much more rapidly after starting of the engine than would be the case without the inclusion of a means for controlling the temperature of coil 54.

An alternative "active" means for controlling the temperature of coil 54 is shown in FIG. 4 and FIG. 5. As shown in FIG. 4, a heating filament 70 is provided around copper coil 54, and can provide an additional source of heat to bring the temperature of the electromagnet up to its optimal range as quickly as possible after the starting of the vehicle. The provision of either an active or passive means for controlling the temperature of the electromagnet increases the generation of electromagnetic emissions which are injected into the cylinders immediately after the starting the vehicle. The means for controlling the temperature of the electromagnet thereby reduces the production of cold start carbon monoxide emissions generated by the vehicle.

Figure 6:
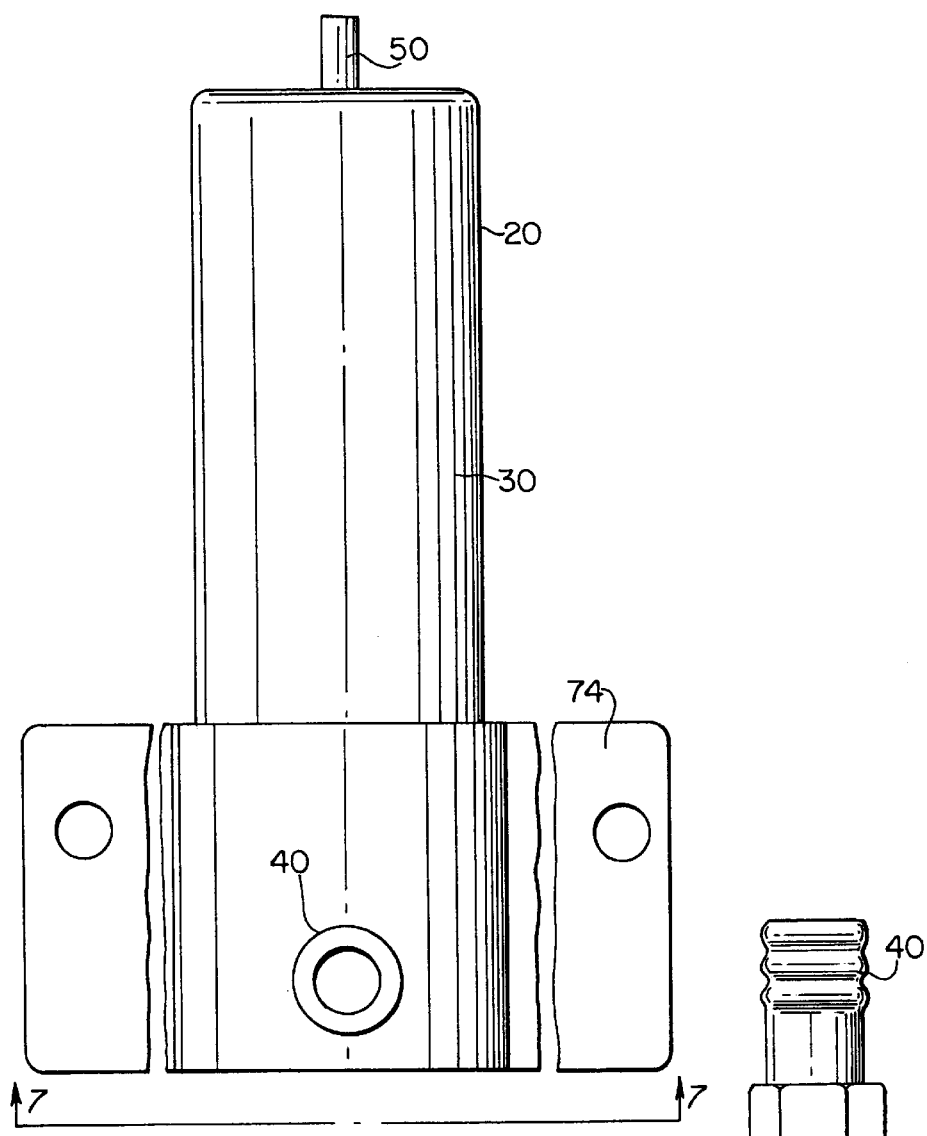
FIG. 6 is a side elevation view of the present invention showing a bracket for mounting the device within the engine compartment of an automobile.
Figure 7:
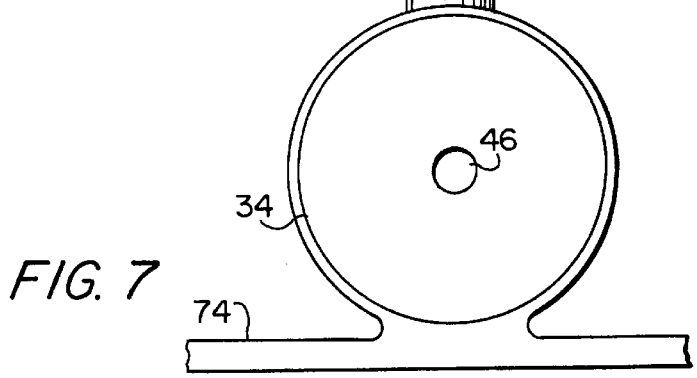
FIG. 7 is a bottom elevation view taken in the direction of arrows 7—7 in FIG. 6.

As shown in FIG. 6, lower part 34 of housing 30 is provided with an integral flange member 74 which enables the mounting of PCT device 20 within the engine compartment.

Modifications and variations of the above-described embodiments are possible, as appreciated by those skilled in the art, in light of the above teachings. For example, the heating filament may be wrapped around the entire coil or around the wire that forms the coil; the exact number of turns in the coil and the physical dimensions of the coil, rod, iron disk and disk-shaped permanent magnet may be varied provided the resulting characteristics of the electromagnetic emissions generated by the PCT are substantially the same as those generated by the components making up the above-described embodiments; the PCT housing can be modified such that the upper and lower parts are assembled together using other well known joining methods including, but not limited to, flanged couplings and butt-welded joints; and the means for mounting the PCT within the engine compartment may be varied in many ways depending on space constraints.

It is therefore to be understood that, within the scope of the appended claims and their equivalents, the invention may be practiced otherwise than as specifically described.

What is claimed is:

1. A combustion and anti-pollution device for a motor vehicle, said device comprising:

a substantially cylindrical housing, said housing having opposite closed ends;

an electrically conductive rod extending through one of said closed ends of said housing, said rod being electrically connected to a source of electrical current;

a coil of electrically conductive wire being connected to said rod and positioned within said housing;

an iron disk mounted within said housing with a central axis of said iron disk being coaxial with a central axis of said rod and said iron disk having an upper and a lower surface;

said coil being electrically connected to and supported on said upper surface of said iron disk;

a disk-shaped permanent magnet being mounted within said housing in facing relationship to said iron disk and being connected to said lower surface of said iron disk with a cavity defined between a lower face of said permanent magnet and the other of said closed ends of said housing; and means for controlling an operating temperature of said coil with said means being mounted within said housing.

2. The device of claim 1 wherein:

said means for controlling an operating temperature of said coil comprises a heating filament wrapped around said coil, with said heating filament being connected to said source of electric current.

3. The device of claim 1 wherein:

said means for controlling an operating temperature of said coil comprises heat insulating material contained within said housing and surrounding said coil.

4. The device of claim 3 wherein:

said heat insulating material comprises a silicon fiber resin material.

5. The device of claim 1 wherein:

said electrically conductive rod comprises a copper and zinc alloy.

6. The device of claim 5 wherein:

said electrically conductive rod is composed of 70% copper and 30% zinc.

7. The device of claim 1 wherein:

said coil includes nineteen turns of wire.

8. The device of claim 7 further including:

a plastic bobbin surrounding a portion of said rod, wherein said coil is wrapped around said bobbin with a first ten turns of said coil being wrapped on said bobbin and the remaining nine turns of said coil overlapping said first ten turns of said coil.

9. The device of claim 1, wherein said rod is approximately 1.75 inches long and 0.115 inch in diameter.

10. The device of claim 1, wherein said iron disk is approximately 0.25 inch thick and 1 inch in diameter.

11. The device of claim 1, wherein said disk-shaped permanent magnet is composed of Alnico 5 and measures 0.75 inch thick and 1 inch in diameter.

* * * * *